United States Patent [19]

Kita et al.

[11] Patent Number: 5,402,263
[45] Date of Patent: Mar. 28, 1995

[54] REAR PROJECTOR HAVING AN ANGLED SCREEN MOUNTING FRAME

[75] Inventors: Tetsuya Kita, Tokyo; Yasuaki Nakanishi, Kanagawa; Shintaro Takahata, Tokyo, all of Japan

[73] Assignee: Sony Corporation, Tokyo, Japan

[21] Appl. No.: 191,925

[22] Filed: Feb. 4, 1994

[30] Foreign Application Priority Data

Feb. 12, 1993 [JP] Japan ................................. 5-023095

[51] Int. Cl.⁶ ............................................. G03B 21/56
[52] U.S. Cl. .................................. 359/451; 359/443; 359/457
[58] Field of Search ............... 359/443, 450, 453, 456, 359/460, 451, 457

[56] References Cited

U.S. PATENT DOCUMENTS

| | | | |
|---|---|---|---|
| 3,610,728 | 10/1971 | Firth | 350/120 |
| 4,984,871 | 1/1991 | Martinez | 350/117 |
| 5,317,449 | 5/1994 | Furuno et al. | 359/443 |

*Primary Examiner*—Richard A. Wintercorn
*Attorney, Agent, or Firm*—William S. Frommer; Alvin Sinderbrand

[57] ABSTRACT

A rear projector for projecting an image onto a display screen mounted on a frame. The frame includes first and second pairs of oppositely disposed mounting members having surfaces adapted to contact the screen. Each mounting member of the first pair is formed of first and second inwardly angled portions which meet at a juncture in a middle region of the member. The screen is coupled to the surfaces of the first and second pairs of mounting members to form an inward curvature of the screen.

21 Claims, 8 Drawing Sheets

REAR PROJECTOR HAVING AN ANGLED SCREEN MOUNTING FRAME

BACKGROUND OF THE INVENTION

This invention relates to a rear projector and, more particularly, to a rear projector having an angled mounting frame for securing a screen to have a predetermined arc.

In conventional rear projectors, such as video projectors as shown in FIG. 1, a cabinet 1 includes cathode-ray tubes 2 for emitting color images to a mirror 4 which reflects the color images to a flexible display screen 6 that is secured to the cabinet by a flat mounting frame 5. Screen 6 typically is made of flexible materials in order to increase the strength and rigidity of large diameter screens which, in a rear projector, may be on the order of at least 40 inches in diameter. However, using flat mounting frame 5 to secure large diameter screens has notable disadvantages.

Since a rear projector utilizes a flexible screen, the screen 6 will arc naturally in response to differences in temperature and humidity between the inside and outside of the rear projector. The size of the arc will fluctuate as a function of changes in the temperature and humidity differences. A fluctuating arc in screen 6 is undesirable for several reasons. For example, if the arc fluctuates to a larger than desirable angle, a double-image effect of the displayed image is produced. Conversely, if the arc fluctuates to a smaller than desirable angle, the screen loses its structural rigidity and thus can be cracked easily. These disadvantages are magnified as thinner screens that improve picture quality are used.

OBJECTS OF THE INVENTION

Therefore, it is an object of the present invention to provide an improved mounting frame which overcomes the aforementioned disadvantages and drawbacks associated with the prior art.

Another object of this invention is to provide a mounting frame capable of maintaining a predetermined arc in the screen of a rear projector regardless of changes in temperature and humidity.

A further object of this invention is to maintain the structural rigidity and strength of the screen of a rear projector.

An additional object of this invention is to reduce the double-image effect of the picture image produced by a rear projector.

Various other objects, advantages and features of the present invention will become readily apparent from the ensuing detailed description, and the novel features will be particularly pointed out in the appended claims.

SUMMARY OF THE INVENTION

In accordance with this invention, a rear projection apparatus is provided for projecting an image onto a display screen that is mounted on a mounting frame to form an inward curvature. The inward curvature of the screen is maintained at a constant angle by using a mounting frame that includes a first pair of oppositely disposed mounting members and a second pair of oppositely disposed mounting members, each member having a surface adapted to contact the screen and each member of the first pair being formed of a first inwardly angled portion and a second inwardly angled portion which meet at a juncture in the middle region of the member.

Preferably, the first and second inwardly angled portions are of equal length and exhibit equal angles so that the portions meet at a center location of the member. In this preferred embodiment, the inward curvature of the screen has an angle equal to the angle formed at the center location of the member. The first pair of oppositely disposed mounting members comprises either top and bottom sides of the mounting frame, or, in the alternative, left and right sides of the mounting frame.

As another embodiment of this invention, the oppositely disposed mounting members include an inner and an outer surface, wherein the inner surface is adapted to contact the screen and the outer surface is adapted to contact a screen frame.

As a further embodiment of this invention, the first pair of oppositely disposed mounting members are formed of an inwardly curved arc, wherein the inward curvature of the screen has an angle equal to the angle of the inwardly curved arc.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF PREFERRED EMBODIMENTS

Figure 1:
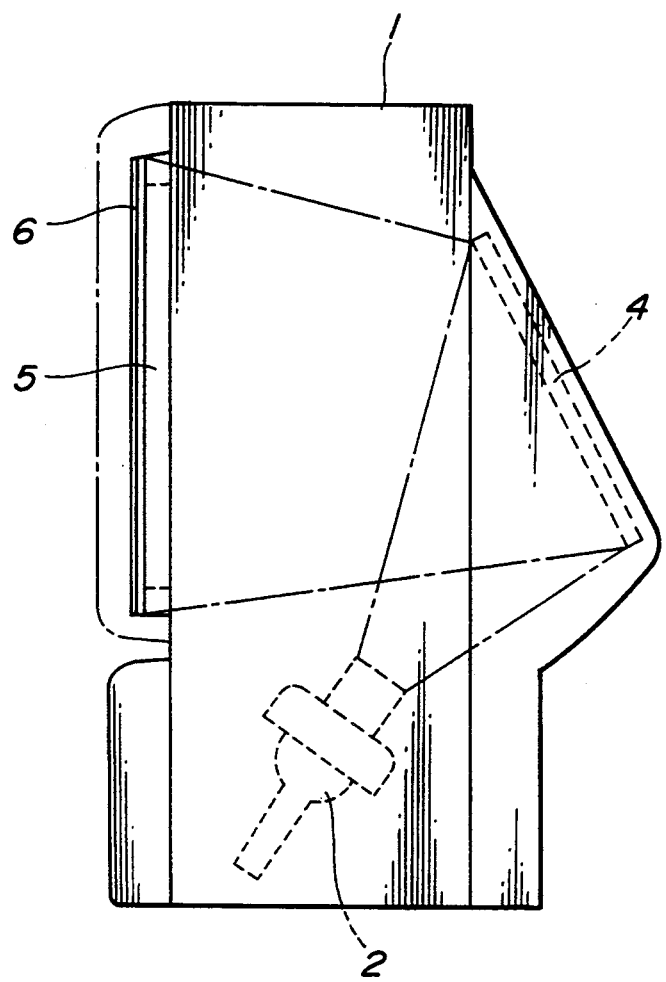
FIG. 1 is a side view of a conventional rear projection apparatus.
Figure 2:
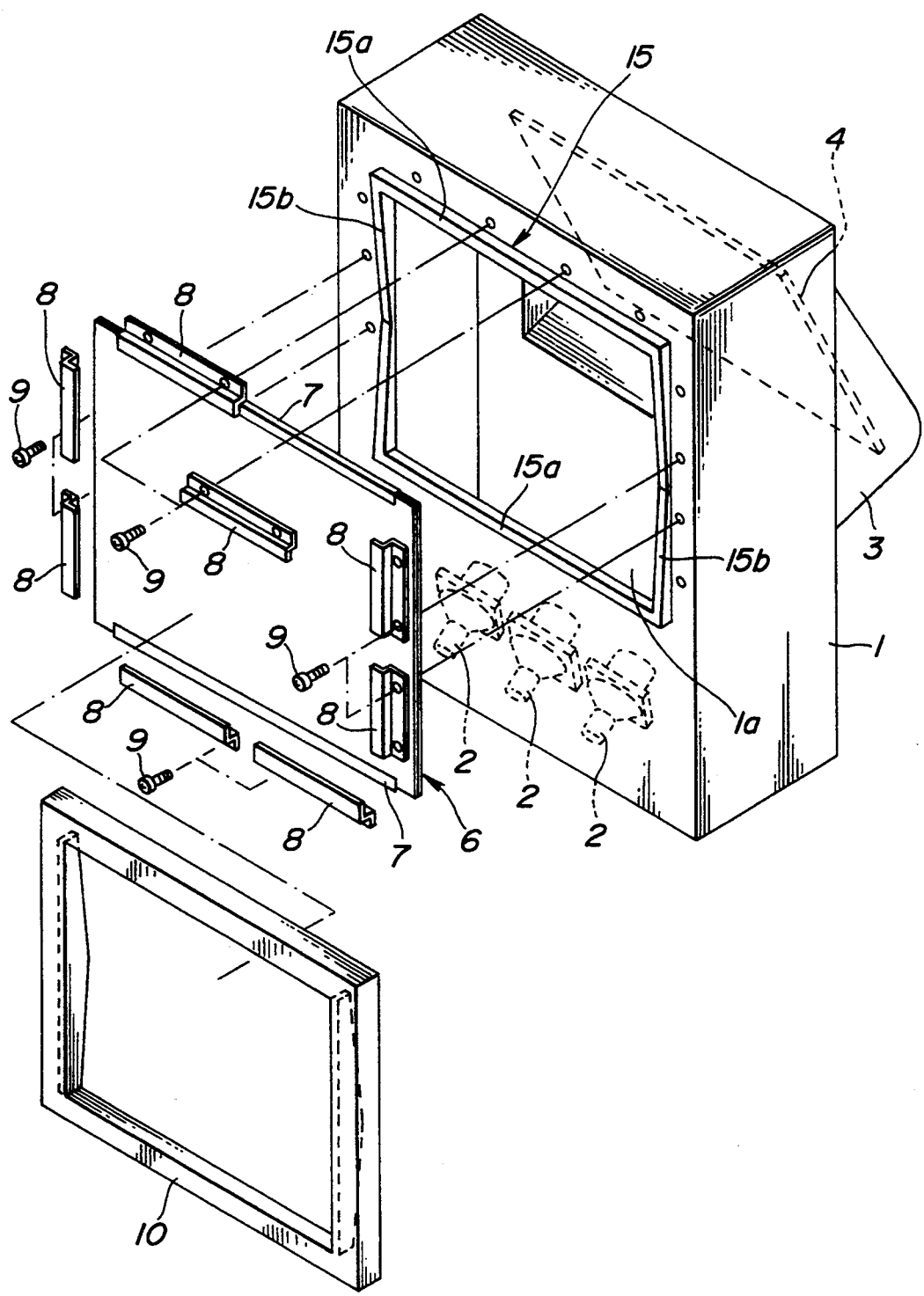
FIG. 2 is an exploded perspective view of a preferred embodiment of the rear projector in accordance with the present invention.

Referring now to the drawings, wherein like reference numerals are used throughout, FIG. 2 illustrates a rear projector exhibiting the desirable features and advantages of the present invention. As illustrated, the rear projector is comprised of a cabinet 1 which includes a plurality of cathode-ray tubes 2, a rectangularly shaped reflecting mirror 4, a mirror cover 3, a rectangularly shaped opening 1a on the front side of cabinet 1 and a rectangularly shaped opening 1b on the back side of cabinet 1. Further, equidistant threaded holes 11 surround each side of opening 1a.

The cathode-ray tubes 2 disposed in the cabinet 1 emit a color image to reflecting mirror 4, such as red, green and blue images. Reflecting mirror 4 is positioned on an incline in the mirror cover 3 for reflecting the image through cabinet 1 via openings 1b and 1a.

The rear projector of FIG. 2 further comprises a screen 6 which is affixed to the cabinet 1 via a mounting frame 15 that is sandwiched between screen 6 and cabinet 1. The screen includes an adhesive tape 7 that will be described later in greater detail. A plurality of fasteners 8 are used to secure screen 6 and mounting frame 15 to the cabinet 1. Each fastener 8 generally comprises sides 8a, 8b and 8c, wherein sides 8a and 8c are substantially parallel to each other and are substantially perpendicular to side 8b. Side 8a includes a hole 12 near each end for accepting screws 9. Two fasteners 8 couple each side of screen 6 and mounting frame 15 (i.e., top, bottom, left and right sides). Generally, the four fasteners that couple the top and bottom sides of screen 6 and mounting frame 15 are of greater length than the four fasteners that couple the right and left sides of the screen and mounting frame since the rectangularly shaped screen and mounting frame are wider than they are tall. For example, screen 6 may be designed for an aspect ratio of 4:3 which requires the top and bottom portions of the screen and mounting frame to be of greater length than the left and right portions thereof in a 4:3 ratio. Utilizing larger fasteners affords greater support to the larger top and bottom sides of the screen and mounting frame.

Figure 7:
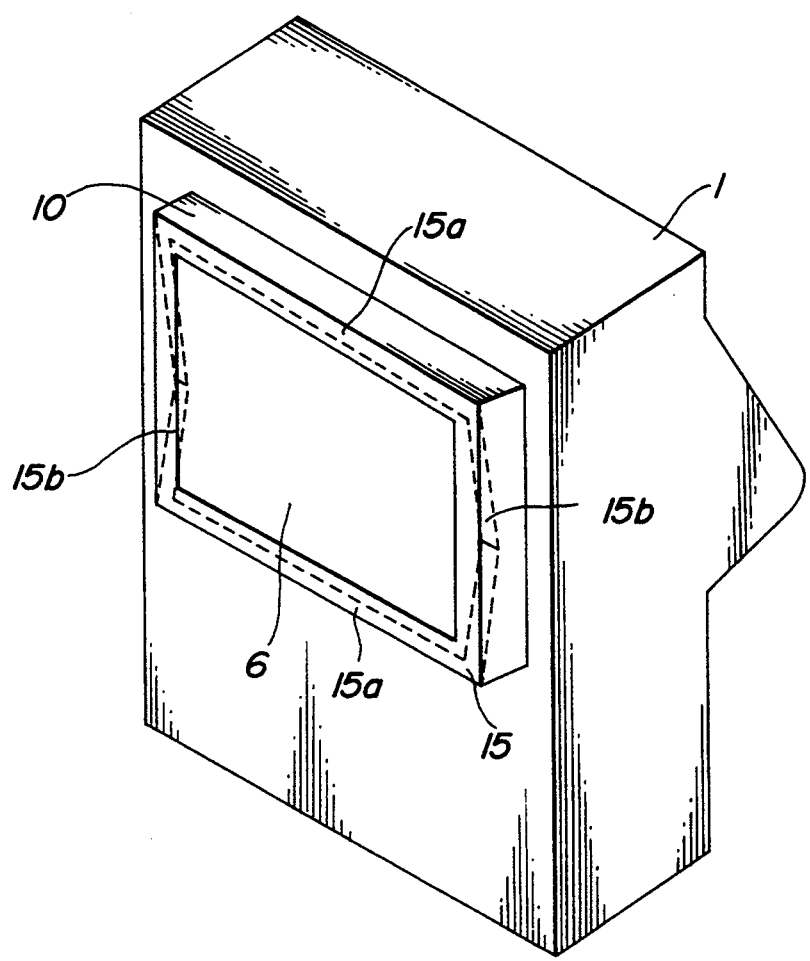
FIG. 7 is a perspective view of a preferred embodiment of the rear projector depicting a screen frame in place over the screen and mounting frame in accordance with the present invention.
Figure 8:
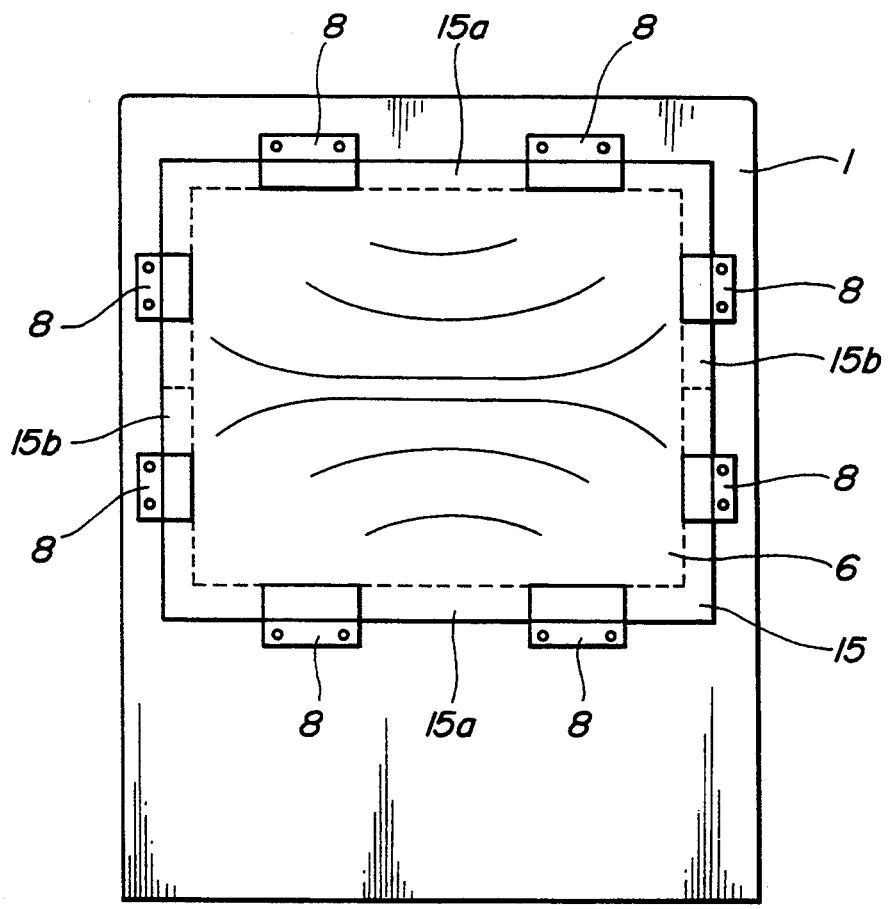
FIG. 8 is a front view of a preferred embodiment of the rear projector depicting the screen secured to the cabinet by a plurality of fasteners in accordance with the present invention.

The assembly of screen 6 and mounting frame 15 will now be described. As shown in FIGS. 2, 7 and 8 the mounting frame is coupled to cabinet 1 over the perimeter of the opening 1a. Screen 6 is placed over mounting frame 15 and fasteners 8 couple the sides of the screen and mounting frame. Screws 9 pass through holes 12 of sides 8a into corresponding threaded holes 11 of cabinet 1. Thus, screen 6 is coupled to mounting frame 15 and secured to cabinet 1. Thereafter, a rectangularly shaped screen frame 10 is placed over the screen and mounting frame assembly to conceal fasteners 8 and screws 9.

Figure 4:
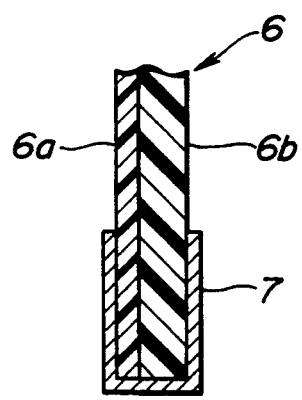
FIG. 4 is a cross-sectional view of the screen of the present invention.

FIG. 4 illustrates the configuration of screen 6. Preferably, screen 6 is comprised of a lenticular layer 6a and a Fresnel lens layer 6b coupled together by an adhesive 7. For example, adhesive 7 may be an acetate tape. Fresnel lens 6b converges the image reflected from mirror 4, while lenticular 6a diverges the image. As a result, the image is displayed by screen 6 without distortion.

Figure 3:
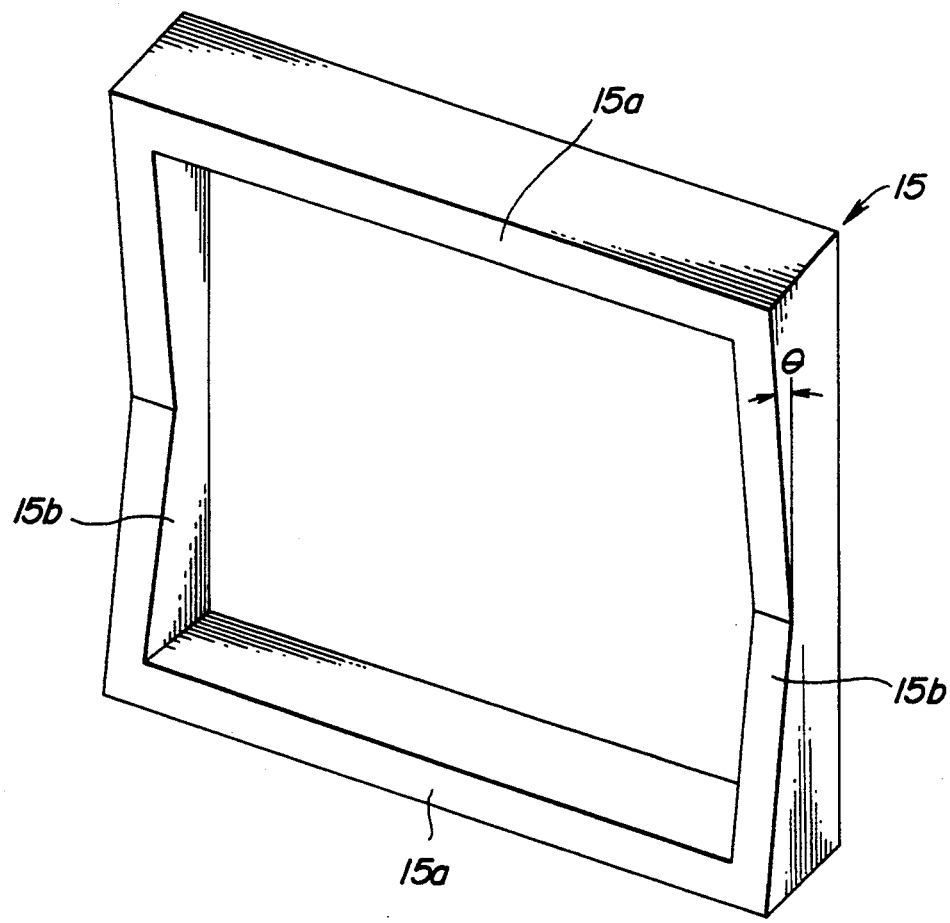
FIG. 3 is a perspective view of one alternative of the mounting frame of the present invention.

Mounting frame 15, as shown in FIG. 3, comprises top and bottom oppositely disposed mounting members 15a forming one pair and left and right oppositely disposed mounting members 15b forming another pair. The pair of top and bottom mounting members 15a are substantially parallel to each other and are coupled at substantially right angles to left and right mounting members 15b that are likewise substantially parallel to each other.

Each mounting member of the respective pairs 15a and 15b has an inner surface adapted to contact screen 6 and an oppositely disposed outer surface adapted to contact the cabinet 1. The outer surface of mounting members 15a and 15b is substantially flat and the inner surface of top and bottom mounting members 15a likewise is substantially flat. However, the inner surface of left and right mounting members 15b is angled. As shown, the left and right mounting members each is formed of a first inwardly angled portion 16 and a second inwardly angled portion 17 which meet at a juncture in a middle region of the left and right mounting members. Preferably, portions 16 and 17 are substantially the same length and are angled at substantially the same predetermined angle $\theta$ to form therebetween an angle $\phi$ ($180° - 2\theta$) at the juncture. Angles $\theta$ and $\phi$ preferably may be 0.7° and 178.6° respectively.

Since screen 6 is flexible, the screen curves inwardly conforming to the shape of mounting frame 15 and thus exhibiting an inward curvature of an angle substantially equal to the angle $\phi$ of mounting members 15b.

Figure 5:
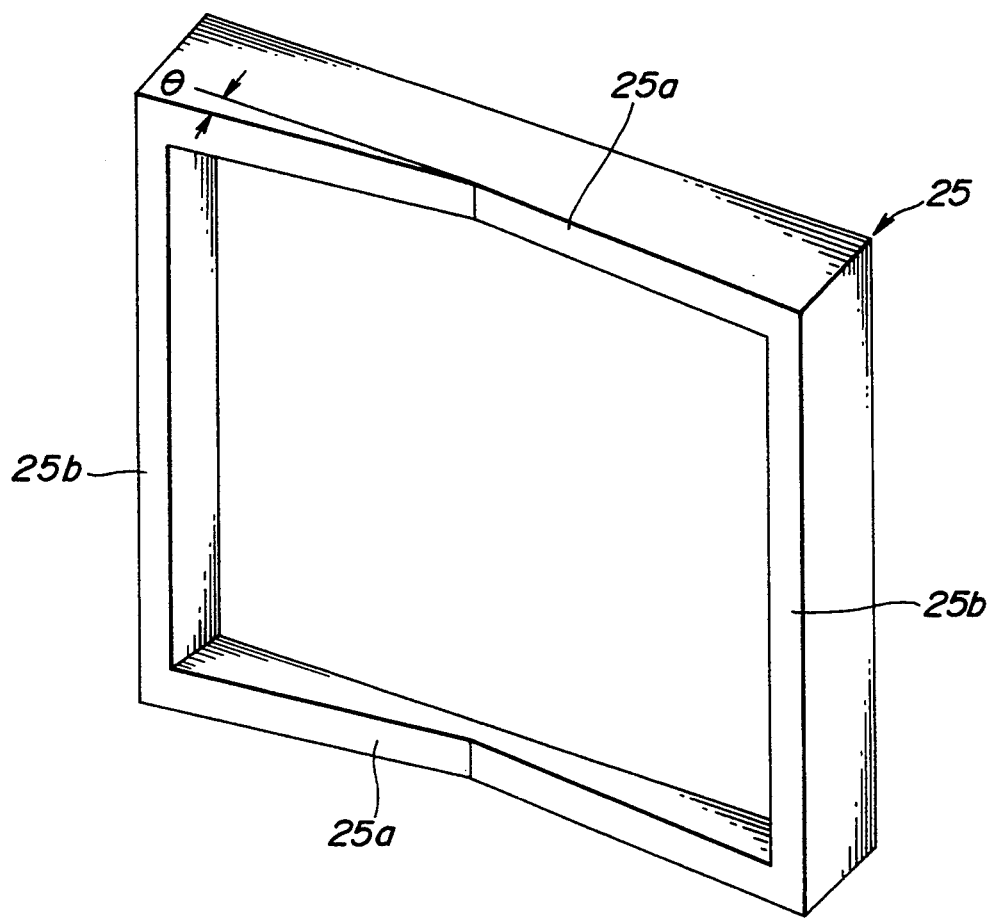
FIG. 5 is a perspective view of another alternative of the mounting frame of the present invention.

Alternatively, as shown in FIG. 5, a mounting frame 25 can be substituted for mounting frame 15 of FIG. 3, having substantially the same configuration and function as mounting frame 15 except that top and bottom mounting members 25a each is formed of inwardly angled portions 26 and 27, whereas left and right side mounting members 25b are flat and are not angled.

Figure 6:
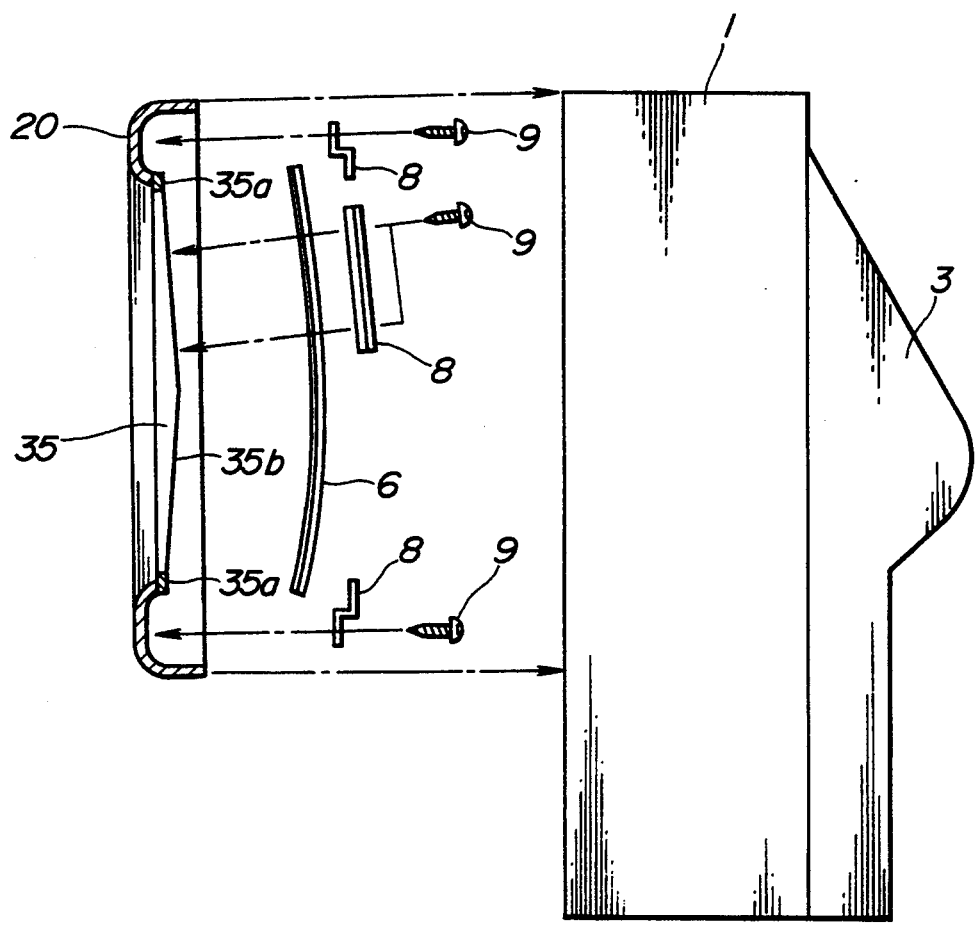
FIG. 6 is an exploded side view of a further embodiment of the rear projector in accordance with the present invention.

FIG. 6 illustrates a rear projector in accordance with a further embodiment of the present invention. Unlike the rear projector of FIG. 3, wherein screen 6 is coupled between mounting frame 15 and screen frame 10, the rear projector of FIG. 6 couples a mounting frame 35 between screen 6 and a screen frame 20; and screen 6 is coupled to cabinet 1. Screen 6 is fastened to screen frame 20 by fasteners 8 and screws 9 in a fashion similar to that shown in FIG. 3. Mounting frame 35 is sandwiched between screen 6 and the screen frame 20; and screen frame 20 is attached to cabinet 1.

Figure 9:
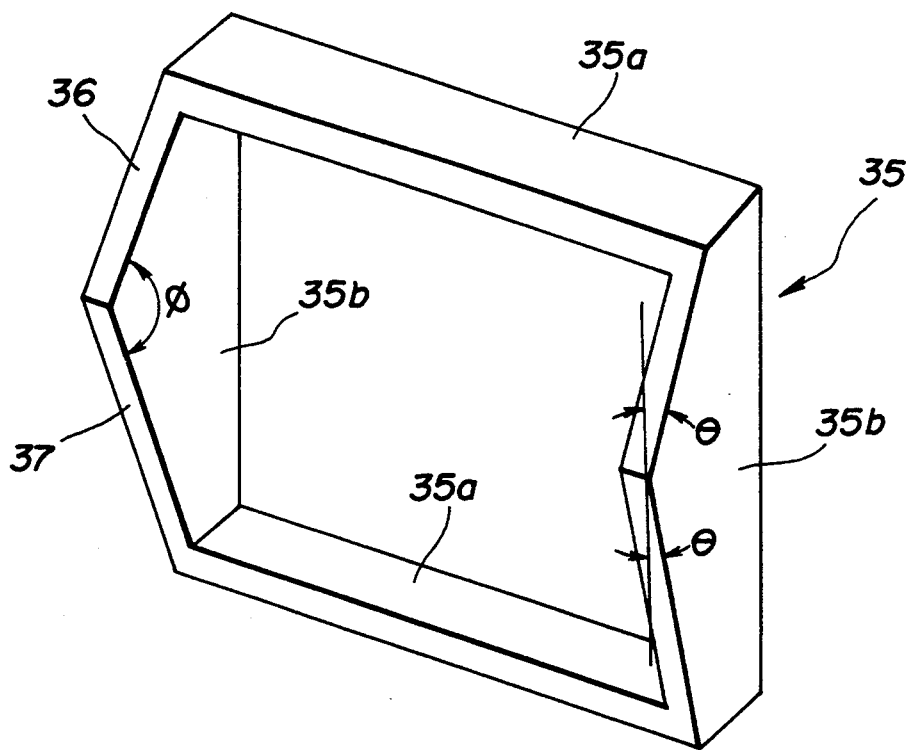
FIG. 9 is a perspective view of the mounting frame in accordance with a further embodiment of the rear projector of the present invention.

As shown in FIG. 9, mounting frame 35 comprises top and bottom oppositely disposed mounting members 35a forming one pair and left and right oppositely disposed mounting members 35b forming another pair. The pair of top and bottom mounting members 35a are substantially parallel to each other and are coupled at substantially right angles to left and right mounting members 35b which are likewise parallel to each other. Each mounting member of the respective pairs 35a and 35b has an outer surface adapted to contact screen 6 and an oppositely disposed inner surface adapted to contact screen frame 20. The inner surface of mounting members 35a and 35b is substantially flat and the outer surface of top and bottom mounting members 35a likewise is substantially flat. However, the outer surface of left and right mounting members 35b is angled. As shown, the left and right mounting members each is formed of a first outwardly angled portion 36 and a second outwardly angled portion 37 which meet at a juncture in a middle region of the left and right mounting members. Preferably, portions 36 and 37 are substantially the same length and are angled at substantially the same predetermined angle $\phi$. As stated hereinabove, screen 6 is flexible and curves inwardly to conform to the shape of mounting frame 35 and thus exhibiting an inward curvature of an angle substantially equal to the angle $\phi$ of mounting members 35b. Although not shown, mounting frame 35 may be modified such that top and bottom mounting members 35a may be angled and left and right side mounting members 35b may be flat.

In the embodiments described hereinabove, the angled portions 16 and 17, 26 and 27, and 36 and 37 of FIGS. 3, 5 and 9, respectively, may be replaced by smoothly curved arcs defining the predetermined angle $\phi$, and the inward curvature of screen 6 likewise will exhibit substantially the same angle $\phi$. While the present invention has been particularly shown and described with reference to preferred embodiments thereof, it will be appreciated by those of ordinary skill in the art that various changes and modifications may be made without departing from the spirit and scope of the invention.

It is intended that the appended claims be interpreted as including the embodiments described herein, the alternatives mentioned above and all equivalents thereto.

What is claimed is:

1. Rear projection apparatus for projecting an image onto a display screen, comprising:
   a screen for displaying said image;
   a mounting frame upon which said screen is mounted, said mounting frame having a first pair of oppositely disposed mounting members and a second pair of oppositely disposed mounting members, each member having a surface adapted to contact said screen and each member of said first pair being formed of a first inwardly angled portion and a second inwardly angled portion which meet at a juncture in a middle region of said member; and
   means for coupling said screen to said surfaces of said first and second pairs of said mounting members to form an inward curvature of said screen.

2. The apparatus according to claim 1, wherein said mounting members form a rectangular shape with said first pair of mounting members forming parallel top and bottom sides and said second pair of mounting members forming parallel left and right sides coupled at substantially right angles to said top and bottom sides.

3. The apparatus according to claim 2, wherein said screen forms a rectangular shape.

4. The apparatus according to claim 1, wherein said first and second inwardly angled portions are of equal length.

5. The apparatus according to claim 4, wherein said first and second inwardly angled portions are inwardly angled at equal angles.

6. The apparatus according to claim 5, wherein said juncture is located at a center location of said member.

7. The apparatus according to claim 6, wherein said inward curvature of said screen comprises an angle equal to the angle formed at said juncture.

8. The apparatus according to claim 7, wherein said angle formed at said juncture to approximately 0.7 degrees.

9. The apparatus according to claim 1, further comprising a cabinet for supporting said mounting frame; cathode-ray tubes disposed in said cabinet for emitting a color image to be displayed; and a reflection mirror disposed in said cabinet for reflecting said color image from said cathode-ray tubes to said screen.

10. The apparatus according to claim 9, wherein said screen is comprised of a first lenticular layer attached to a second Fresnel lens layer.

11. The apparatus according to claim 10, further comprising a rectangular screen frame mounted on said mounting frame and sandwiching said screen therebetween, said screen frame having a pair of outwardly angled members that correspond to the first pair of mounting members of said mounting frame for further supporting said inward curvature of said screen.

12. The apparatus according to claim 1, wherein the mounting members of said first pair are respectively disposed at top and bottom sides of said mounting frame.

13. The apparatus according to claim 1, wherein the mounting members of said first pair are respectively disposed at left and right sides of said mounting frame.

14. The apparatus according to claim 1, wherein each member of said second pair of oppositely disposed mounting members consists of a flat portion.

15. Rear projection apparatus for projecting an image onto a display screen, comprising:
   a screen for displaying said image;
   a mounting frame upon which said screen is mounted, said mounting frame having a first pair of oppositely disposed mounting members and a second pair of oppositely disposed mounting members, each member having a surface adapted to contact said screen, and each member of said first pair being formed of an inwardly curved arc; and
   means for coupling said screen to said surfaces of said first and second pairs of said mounting members to form an inward curvature of said screen.

16. The apparatus according to claim 15, wherein each member of said second pair of oppositely disposed mounting members consists of a flat portion.

17. The apparatus according to claim 15, wherein said inward curvature of said screen comprises an angle equal to an angle of said inwardly curved arc of said first pair of oppositely disposed mounting members.

18. The apparatus according to claim 15, wherein said screen is comprised of a first lenticular layer attached to a second Fresnel lens layer.

19. Rear projection apparatus for projecting an image onto a display screen, comprising:
   a screen for displaying said image;
   a mounting frame upon which said screen is mounted, said mounting frame having a first pair of oppositely disposed mounting members and a second pair of oppositely disposed mounting members, each member having an inner surface adapted to contact said screen and an outer surface adapted to contact a screen frame, each inner surface member of said first pair being formed of a first outwardly angled portion and a second outwardly angled portion which meet at a juncture in a middle region of said member; and
   means for coupling said screen to said screen frame and sandwiching said mounting frame between said screen frame and said screen to form an inward curvature of said screen.

20. The apparatus according to claim 19, wherein each member of said second pair of oppositely disposed mounting members consists of a flat portion.

21. The apparatus according to claim 19, wherein said screen is comprised of a first lenticular layer attached to a second Fresnel lens layer.

* * * * *